US007433894B2

(12) United States Patent
Drissi et al.

(10) Patent No.: US 7,433,894 B2
(45) Date of Patent: Oct. 7, 2008

(54) METHOD AND SYSTEM FOR SEARCHING A MULTI-LINGUAL DATABASE

(75) Inventors: Youssef Drissi, Ossining, NY (US); Moon Ju Kim, Wappingers Falls, NY (US); Lev Kozakov, Stamford, CT (US); Juan Leon Rodriguez, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 11/151,047

(22) Filed: Jun. 13, 2005

(65) Prior Publication Data

US 2005/0234898 A1    Oct. 20, 2005

Related U.S. Application Data

(63) Continuation of application No. 10/066,346, filed on Feb. 1, 2002, now Pat. No. 6,952,691.

(51) Int. Cl.
*G06F 17/00* (2006.01)
(52) U.S. Cl. .................. 707/104.1; 707/101; 707/102; 707/103 R
(58) Field of Classification Search .............. 707/1–10, 707/100–104.1, 200–206
See application file for complete search history.

(56) References Cited

U.S. PATENT DOCUMENTS

| 5,136,505 | A |   | 8/1992  | Inamori et al. ............. 364/419 |
| 5,956,711 | A |   | 9/1999  | Sullivan et al. .............. 707/6 |
| 5,956,740 | A |   | 9/1999  | Nosohara ................... 707/536 |
| 6,081,774 | A |   | 6/2000  | de Hita et al. ................ 704/9 |
| 6,085,162 | A | * | 7/2000  | Cherny ...................... 704/277 |
| 6,163,785 | A |   | 12/2000 | Carbonell et al. .......... 707/530 |
| 6,219,646 | B1|   | 4/2001  | Cherny ...................... 704/277 |
| 6,226,638 | B1| * | 5/2001  | Okura et al. .................. 707/5 |
| 6,604,101 | B1| * | 8/2003  | Chan et al. ................... 707/4 |

FOREIGN PATENT DOCUMENTS

| EP | 1 072 984 A2 | * | 1/2001 |
| JP | 10187752     |   | 7/1998 |
| JP | 11219368     |   | 8/1999 |

OTHER PUBLICATIONS

IBM Technical Disclosure Bulletin, vol. 35, No. 4A, pp. 306-307, Sep. 1992 "Language-Sensitive Search Techniques".

(Continued)

*Primary Examiner*—Isaac M Woo
(74) *Attorney, Agent, or Firm*—Norman L. Gundel; Hoffman Warnick LLC

(57) ABSTRACT

A system and method of searching a database in which documents of different languages are included. The system includes a synonym or keyword dictionary which is bi-directional and allows for translation of keywords between a first language and other languages. The translated words keywords for the document are stored in an inverted index which is then used for searching, either in a selected language, a second language or in all languages, as determined by the user. This use of multiple searching and a translated synonym dictionary avoids the need for translation of the entire document and avoids inaccuracies which may result from translations.

9 Claims, 4 Drawing Sheets

OTHER PUBLICATIONS

IBM Technical Disclosure Bulletin, vol. 38, No. 03, pp. 405-410, Mar. 1995 X/Open Message Translation Tool (Xalta) for AIX.

Program, Jan. 2000. Lange et al., "Multilingual Access to Web Resources: An Overview" pp. 43-58.

World Patent Information, vol. 21, issue 2, Jun. 1999, M. Lyon, Language Related Problems in the IPC and Search System Using Natural Language, pp. 89-95.

Proceedings, 11th International Workshop on Database and Expert Systems Applications, London, Sep. 4-8, 2000, A. Dusterhoft et al., "A Heuristic Approach for Recognizing a Document's Language Used for the Internet Search Engine GETESS" pp. 133-137.

Mini-Micro Systems, vol. 20 No. 5, May 1999, "Design and Implementation of Data Acquisition in WWW-based Chinese-English Search Engine", pp. 339-342 (only Abstract on p. 342 is in English).

Electronic Commerce and Web Technologies, First International Conference, EC-Web 2000, London, Sep. 4-6, 2000, Proceedings, Lecture Notes, A. Mujoo et al., "A Search Engine for Indian Languages", pp. 349-358.

Medical Informatics Europe '99 J. Dimec et al., "WWW Search Engine for Slovenian and English Medical Documents", pp. 547-552.

First IEEE/POPOV Workshop on Internet Technologies and Services Proceedings, Oct. 25028, 1999 E. Kolmanovskaia "Yandex.Ru—Search and Research Engine" pp. 157-158.

* cited by examiner

METHOD AND SYSTEM FOR SEARCHING A MULTI-LINGUAL DATABASE

This application is a continuation of U.S. patent application Ser. No. 10/066,346, filed on 02/01/2002 now U.S. Pat. No. 6,952,691, which is hereby incorporated herein by reference.

BACKGROUND OF THE INVENTION

1. Field of the Invention

The present invention relates to the field of searching a database using search term(s) entered by a user. More particularly, the present invention is a system and method for searching on a database including material in different languages where the search term(s) are entered in one of the languages where the database need not be translated into the different languages.

2. Background Art

Various methods have been proposed for searching a database wherein the database includes material in multiple languages. One approach is to translate the entire database into the language in which a search term is entered or the language of the user. However, this could involve a large amount of translation for a sizable database (and multiple translations if the database is used by users in different languages). Further, each process of translating a document has the potential for losing (or distorting) some of the meaning of the original text.

For these reasons, it is desirable to avoid translating the documents to allow for a search in a particular language.

Another approach is to use synonym list and apply it to the search term(s) entered in one language. That is, the text of the documents in the database remain in the original language and synonyms in each language for each search term(s) are used for the search of the database. This system may work in some cases but is undesirable in other cases because considering all of synonyms in the different languages could lead to incorrect results. The word for "network" in Spanish is "red" and a search on "network" which blindly translates the search term would incorrectly find English documents which include the color "red".

Further, some of the documents include text in one language and key words presented in a different language to avoid changing the meaning. Thus, it is desirable to search a database which includes these terms but would not be effective to search only for the translated form of the word.

As will be apparent to one skilled in the relevant art, the process of translating and searching in multiple languages can consume substantial computing resources. Many of the multi-language database searching techniques require a powerful computer or take an inordinate amount of time to process a single search, the amount depending on the size of the database, the number of supported languages and the nature of the queries. However, the computing resources have a cost associated with them, either in requiring a larger or faster system or in terms of tying up the computer while a large task is running to the exclusion of other users. Further, a search which takes a long period of time may prevent the user from interactively modifying the search to obtain meaningful results. Accordingly, it is desirable to avoid using large computing resources.

Accordingly, existing systems methods for searching databases have undesirable disadvantages and limitations which will be apparent to those skilled in the art in view of the following description of the present invention.

SUMMARY OF THE INVENTION

The present invention overcomes the disadvantages and limitations of the prior art systems by providing a simple, yet effective, method and system for searching a database including documents in multiple supported languages. The present invention also supports searching a database in which the text is comprised of documents written in multiple languages, including those documents which are written in one language but which include words or phrases from a second language.

The present invention has the advantage that a translation of the documents in the database into each of the supported languages is not required.

The present invention also has the advantage that the meaning of the original document is not lost or distorted through a translation process to allow searching of the document in different languages.

The present invention also allows for the searching of a database in a native or natural language while finding documents which are written in other languages.

Other objects and advantages of the system and method of the present invention will be apparent to those skilled in the relevant art, in view of the following description of the preferred embodiment, taken together with the accompanying drawings and the appended claims.

BRIEF DESCRIPTION OF THE DRAWINGS

Figure 1:
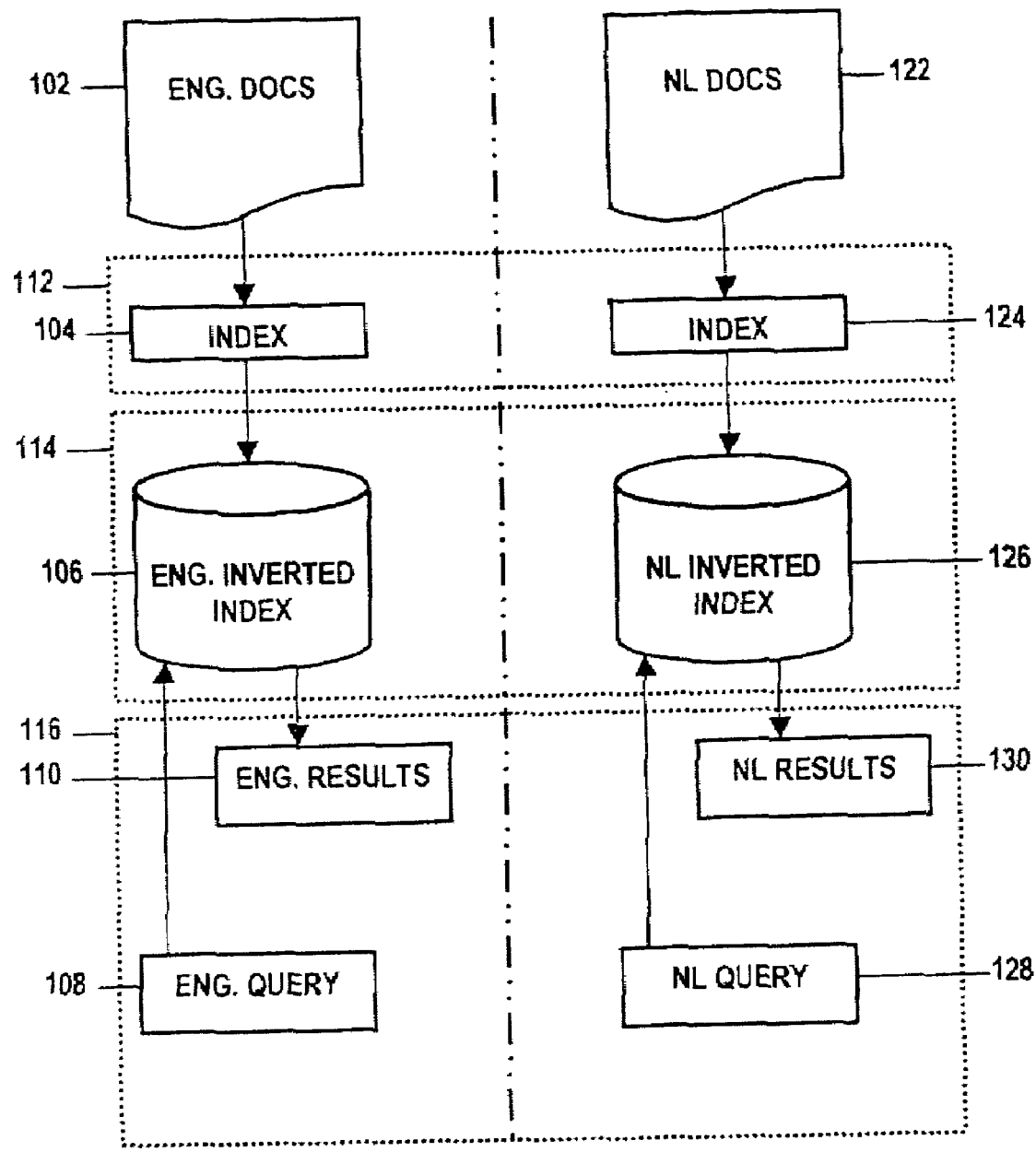
Figure 2:
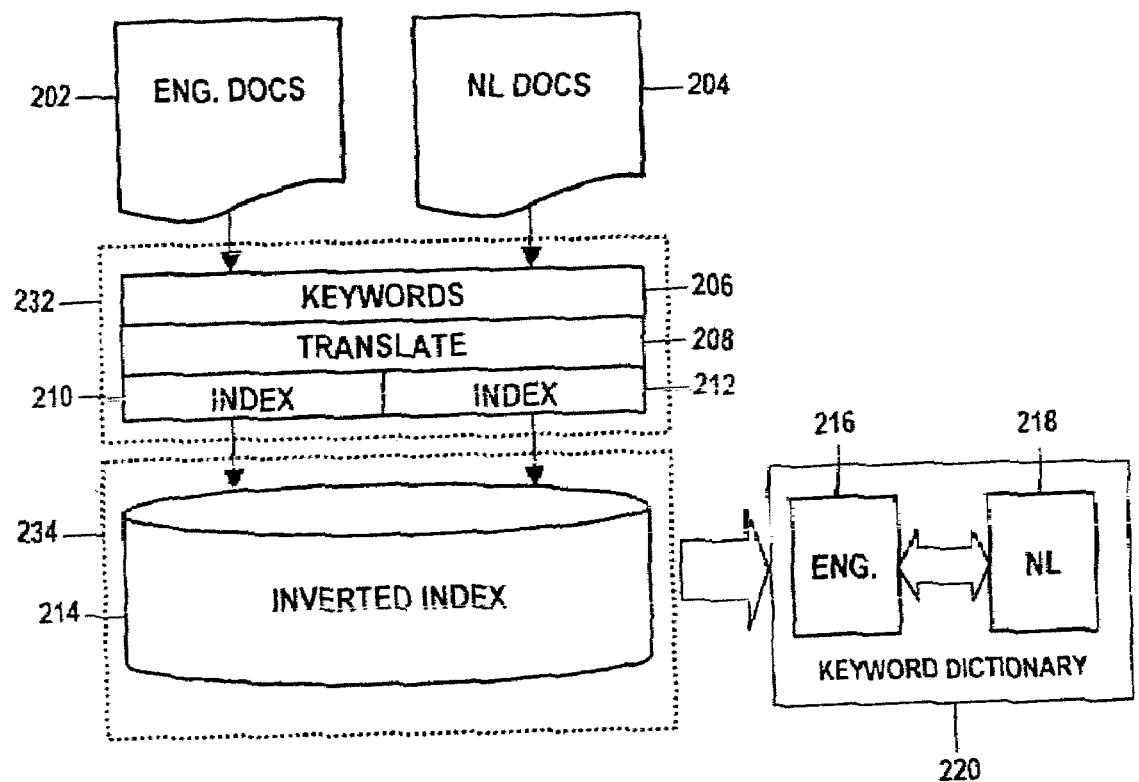
Figure 3:
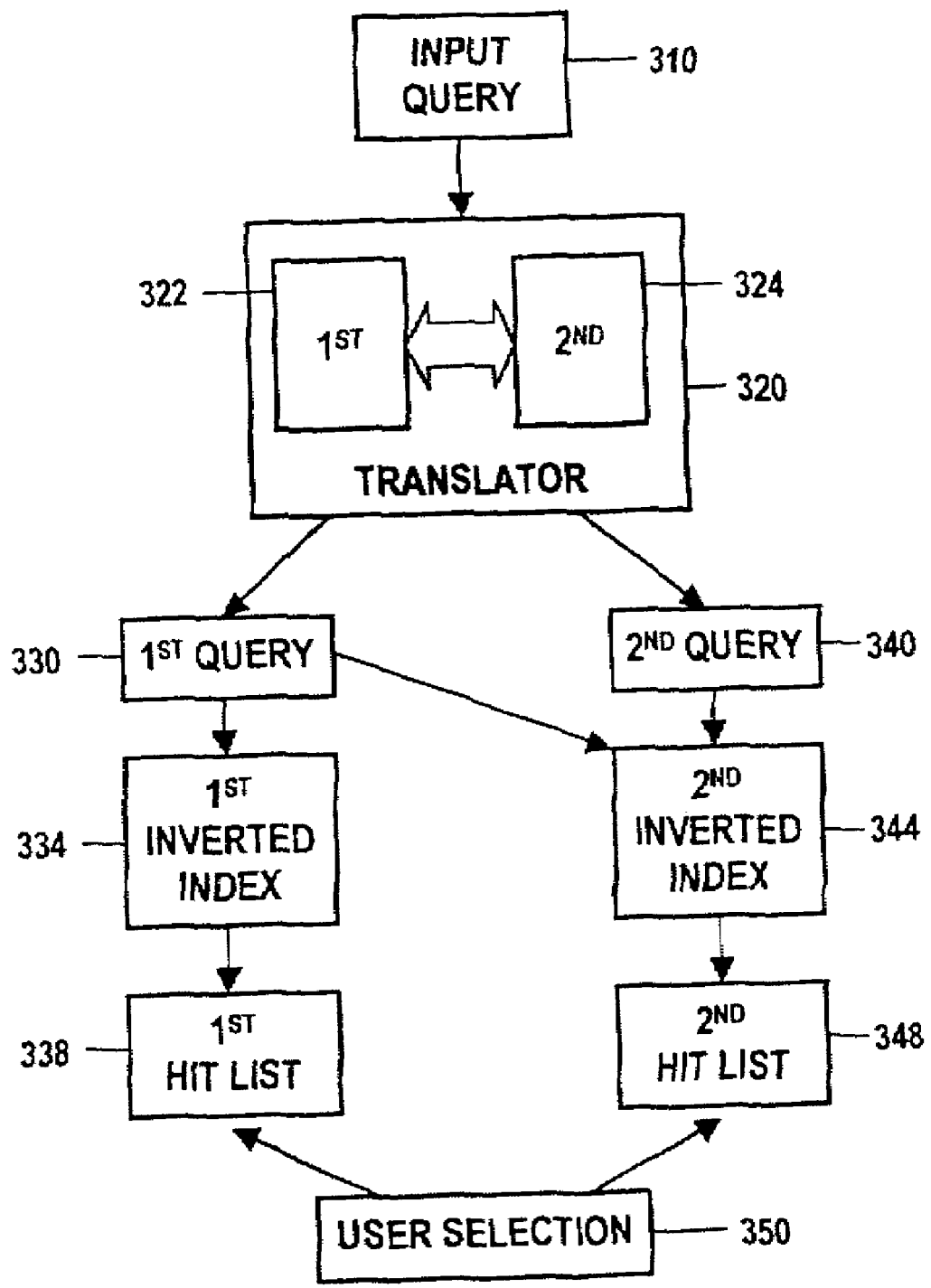
Figures 4, 5:
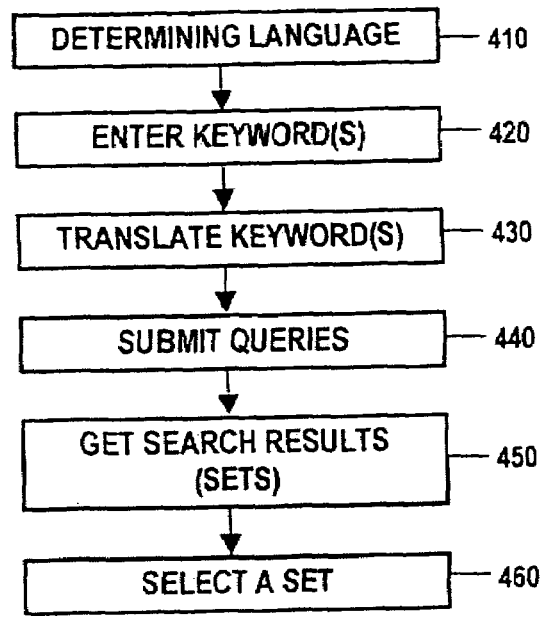

Having thus described some of the objects and advantages of the present invention, other objects and advantages will be apparent to those skilled in the art in view of the following description of the invention taken in conjunction with the accompanying drawings in which:

FIG. 1 is a diagrammatic view of a traditional search technique in which documents exist in two different languages;

FIG. 2 is a diagrammatic view of a diagram of an improved multi-lingual document database index system of the present invention;

FIG. 3 is a dual language (or multi-language) database search system of the present invention;

FIG. 4 is a flow chart illustrating sample logic performed in practicing the present invention; and FIG. 5 is a synonym table of the type which is useful in carrying out the present invention as described in connection with FIGS. 2-4, associating a word in one language with its counterpart in another language.

DETAILED DESCRIPTION OF THE PREFERRED EMBODIMENT

In the following description of the preferred embodiment, the best implementation of practicing the invention presently known to the inventor will be described with some particularity. However, this description is intended as a broad, general teaching of the concepts of the present invention describing a specific embodiment but is not intended to be limiting the present invention to that as shown in this embodiment, especially since those skilled in the relevant art will recognize many variations and changes to the specific structure and operation shown and described with respect to these figures.

FIG. 1 illustrates a traditional search system, that is, one of the prior art, in which documents in English (a first language) are represented by the symbol 102 and documents in a second language such as a national language (NL) are represented by the symbol 122. While each set of documents is maintained separately, each is indexed through a process of extracting the keywords and creating an index, represented by the box 104 for the English documents 102 and the box 124 for the second language documents 122. The next step is that an inverted index is performed for each set of documents, the English inverted index at block 106 and the second language index represented by block 126. Then, a search or query is formatted and applied against a selected one of the databases, represented by an English query at 108 and a national language query at block 128. The results of the English query are shown by block 110 and the results of a national language query are represented by the box 130. Thus, the steps of the process are carried out separately for each database and including indexing the document at block 112, creating an inverted index at block 114 and conducting a search and providing an output at block 116. While the steps are the same regardless of which type of database is used, each database is kept separate and each is searched separately and each generates separate results. Since this same structure could be applied to any number of separate databases, this system could expand to support the number of languages desired.

However, some technical documents are written in a native language (such as Spanish) but use technical terms from another language (for example, from English). In such a system, searching the national language database for the national language equivalent of a search term will not find the search term if it is included in the document in another language.

FIG. 2 illustrates a system for merging documents in different languages into a single index. As shown in this Figure, documents in a first language (English) are represented by the symbol 202 and documents in a second language (a national language) are represented by the symbol 204. Keywords are identified from each document in a step 206, then translated into each supported language at block 208. Separate indices 210, 212 in each language are created from the translated keywords. Then, an inverted index 214 is created from the translated keywords. The translation of keywords is preferably accomplished using a keyword dictionary 220 which included words in English associated with the corresponding keywords in the national language (and vice versa) to form a synonym listing which effectively translates a keyword in one language into the corresponding term in another language (and vice versa). This listing of synonyms accomplishes the translation of keywords in the creation of the indices and for later searching as will be described in connection with FIG. 3. In order to manage various languages, it is proposed to translate each term using the Unicode system (UTF8), although any other system which is accurate and consistent could also be used to advantage in the present invention.

Thus, the process of creating an inverted index involves steps of creating in block 232 an index in each language and in creating a merged inverted index in block 234 using the keyword dictionary 220 which includes synonyms in each supported language. While two languages are shown in the figures of the present invention, the present invention can easily be expanded to support the desired number of languages, and, while English is described as one language for the documents and for the searches, the present invention is not limited to serving documents in English and another language could be substituted, if desired.

FIG. 3 illustrates a search system of the type which is useful in the present invention. A query is input at block 310 then passed to a keyword dictionary represented by block 320. The keyword dictionary 320 includes a bi-directional translation system which translates keywords from the English (or first) language 322 to a national (or second) language 324 and vice versa, using, in its preferred embodiment, a stored synonym list in the form of a bi-directional table such as is illustrated and described later, particularly in connection with FIG. 5. The synonym table is designed to support a plurality of languages and allow translation between the supported languages. The result is a pair of queries, one query 330 in the first language (e.g., English) and a second query 340 in a second language (such as the national language). The English language query 330 is applied against both the English inverted index 334 and the national language index 334, and the national language query 340 is applied against the national language index 344, and generate results: an English-language hitlist 338 and a national language hitlist 348. The user then can select (represented by the box 350) which results are of interest to the user, at least to start the process, since it is possible that the user will select one, determine that it is inappropriate and try another selection. If the user has limited capabilities in understanding English, he may prefer to look at the results 348 in the national language. If the national language results 348 are not sufficient (or nonexistent), then he may go on to the English language results 338. In the alternative, the user may recognize that the results of interest are most likely to be the English results 338 and may start with those results. In another alternative, the user finds so many results in English that he decides to review the more selective list in his national language.

FIG. 4 illustrates a flow chart of one process of practicing the present invention. As shown in this FIG. 4, the process begins with a determination of the language of the user and whether the user wishes to limit his universe to documents written in his native language. The first step is to determine the language of the user at block 410. Perhaps the user has entered his native or national language or perhaps it is determined from his entries, such as a query in a given language. Then, at block 420 the user enters the query in terms of keywords. Those keywords are translated at block 430 and the queries produced are submitted to the searching mechanism at block 440. Results are obtained at the block 450 and a set of results may be selected at block 460.

In FIG. 5, a portion of synonym table is shown by the reference numeral 500. The table includes a plurality of columns, each associated with a different language. In the FIG. 5 as shown, these supported languages are English in column 510, Spanish in column 520, French in column 530 and Italian in column 540. An additional column 550 is shown provided for another language such as German or Japanese, recognizing, of course, that some languages have different type of characters from English and some languages have so many different symbols that it may be necessary to use a double byte character set to represent some of such languages like Japanese. Two sets of synonyms are shown in rows in this FIG. 5, one associated with the English word "network" in row 560 and one associated with the English word "processor" in row 570. In practice, the synonym table 500 may have additional columns as desired as shown by the symbol 590 (or may have fewer columns if fewer languages are supported and the selection of supported languages is a matter of design choice and not a feature of the present invention) and will have a row for each keyword, shown by the symbol 580. It is important to note that each entry is associated with a language so that it is possible to associate a word with its language and distinguish between the Spanish word for network (red) from the English word for the color red, if desired. While the table is shown in tabular form for ease in understanding the concept of a synonym table, the table may exist in other known formats in storage according to conventional data processing techniques.

The present invention, it will be recognized, is especially adapted for use in a data processing system such as a general purpose computer with a stored program containing computer program means including a plurality of instructions. Those instructions will generally be written in a high level language which is readable by a human and translated into machine language, that is, simple instructions which are understood by the data processing system. In an appropriate instance such instructions could be directly written in a machine language programming language, if desired, a system which allows for efficiency of execution but which is more difficult to program. The present invention is not limited to any particular input language.

As used in the present document, software, computer program and computer program means are used interchangeably. Software in the present context means any expression, in any language, code or notation, of a set of instructions intended to cause a system having an information processing capability to perform a particular function either directly or after either or both of the following a) conversion to another language, code or notation; b) reproduction in a different material form. The use of the Unicode system for managing different languages has been used in the description of the preferred embodiment but other suitable methods for representing different languages could also be used to advantage in the present invention, if desired.

The term national language has been used to represent a language associated with a user of the system. This language could be any language supported by the system, and might include different languages for different users. So, "national language" might represent Spanish for a Mexican or a person from Spain and might represent French for a person from France or other French-speaking locales. Appropriate synonym tables are available for a variety of common languages as are systems for locating key words and separating common text with little uniqueness from key words which are descriptive of the document under consideration. Such key word locating systems are often technologically directed and identify words which are of interest to the technology under consideration.

Of course, many modifications of the present invention will be apparent to those skilled in the relevant art in view of the foregoing description of the preferred embodiment, taken together with the accompanying drawings and the appended claims. For example, the present invention has been described in connection with documents and searches in English and in a national language whereas the number of supported languages need not be 2 and need not be a single national language. Further, in some circumstances, the documents could be written in a combination of supported languages. Additionally, some elements of the present invention can be used to advantage without the corresponding use of other elements. For example, the use of the synonym or keyword dictionary is not the only way to accomplish the translation of keywords into other language. Further, various other devices could be substituted to advantage depending on the environmental circumstances. Accordingly, the foregoing description of the preferred embodiment should be considered as merely illustrative of the principles of the present invention and not in limitation thereof.

Having thus described the invention, what is claimed is:

1. A computerized method of searching documents written in a plurality of languages, the method comprising:
   identifying keywords from each of the plurality of documents;
   translating each identified keyword into each of the plurality of languages;
   creating an index in each of the plurality of languages;
   receiving a first query that includes at least one keyword in a first language;
   generating a second query by translating the at least one keyword into a second language;
   applying the first query against documents written in both the first language and the second language;
   applying the second query against documents written in the second language;
   generating a first set of results that includes each document written in the first language that matches the first query; and
   generating a second set of results that includes each document written in the second language that matches at least one of the first query or the second query.

2. The method of claim 1, wherein the generating a second query step uses a keyword dictionary that supports translation between the plurality of languages.

3. The method of claim 2, wherein the keyword dictionary includes a synonym listing that translates a keyword in any of the plurality of languages into a corresponding keyword in another of the plurality of languages.

4. The method of claim 1, wherein the generating a second query step translates the at least one keyword using the Unicode system.

5. The method of claim 1, further comprising providing at least one of the first and second sets of results for display to a user.

6. The method of claim 1, wherein the applying the first query step includes:
   applying the first query against an inverted index in the first language; and
   applying the first query against an inverted index in the second language.

7. The method of claim 1, further comprising creating a single inverted index from the translated keywords.

8. The method of claim 1, wherein the translating step uses a keyword dictionary that supports translation between the plurality of languages.

9. The method of claim 1, further comprising determining a native language of a user.

* * * * *